US010208903B2

(12) United States Patent
Eivaz

(10) Patent No.: US 10,208,903 B2
(45) Date of Patent: Feb. 19, 2019

(54) WRIST BAND WITH INTEGRATED ROTATABLE LIGHT

(71) Applicant: Ahmad Eivaz, San Diego, CA (US)

(72) Inventor: Ahmad Eivaz, San Diego, CA (US)

( * ) Notice: Subject to any disclaimer, the term of this patent is extended or adjusted under 35 U.S.C. 154(b) by 0 days.

(21) Appl. No.: 15/688,793

(22) Filed: Aug. 28, 2017

(65) Prior Publication Data

US 2018/0112839 A1 Apr. 26, 2018

Related U.S. Application Data

(60) Provisional application No. 62/413,323, filed on Oct. 26, 2016.

(51) Int. Cl.

| | |
|---|---|
| ***F21V 21/14*** | (2006.01) |
| ***F21L 4/04*** | (2006.01) |
| ***A44C 5/00*** | (2006.01) |
| ***F16B 1/00*** | (2006.01) |
| ***A44C 5/14*** | (2006.01) |
| ***A44C 15/00*** | (2006.01) |

(52) U.S. Cl.

CPC .............. *F21L 4/04* (2013.01); *A44C 5/0007* (2013.01); *A44C 5/14* (2013.01); *A44C 15/0015* (2013.01); *F21V 21/145* (2013.01)

(58) Field of Classification Search

CPC ........ F21V 21/145; F21L 4/04; A44C 5/0007; F16B 1/00

USPC .......................................................... 362/191

See application file for complete search history.

(56) References Cited

U.S. PATENT DOCUMENTS

| | | | | |
|---|---|---|---|---|
| 3,550,824 A * | 12/1970 | Bohanski | F21V 21/08 224/197 |
| 7,815,334 B2 | 10/2010 | Sherman | |
| 9,803,810 B2 * | 10/2017 | Vamberi | F21V 5/08 |
| 2007/0014115 A1 * | 1/2007 | Katz | F21V 21/30 362/382 |
| 2011/0108589 A1 * | 5/2011 | Kim | A45F 5/00 224/222 |
| 2014/0182088 A1 * | 7/2014 | Roberts | B42F 1/00 24/303 |

* cited by examiner

*Primary Examiner* — Toan Ly

(74) *Attorney, Agent, or Firm* — Coastal Patent Law Group, P.C.

(57) ABSTRACT

The disclosure concerns a wristband with integrated rotatable light, including: a band; a base coupled to the band; a light housing rotationally coupled to the base; and the housing configured to receive a light nested within a light housing. The wristband with integrated rotatable light is characterized in that upon the application of rotational force, the light housing is configured to rotate about the base thereby providing light in various directions.

11 Claims, 11 Drawing Sheets

WRIST BAND WITH INTEGRATED ROTATABLE LIGHT

CROSS-REFERENCE TO RELATED APPLICATIONS

This application claims benefit of U.S. Provisional Ser. No. 62/413,323, filed Oct. 26, 2016, titled "WRIST BAND HAVING INTEGRATED LIGHT"; the entire contents of which are hereby incorporated by reference.

BACKGROUND OF THE INVENTION

Field of the Invention

This invention relates to flashlights and related accessories; and more particularly, to a wrist band having an integrated flashlight housing that is rotatable for projecting a beam of the flashlight in one of many orientations relative to the band.

Description of the Related Art

Flashlights are well known and used in the art to provide light necessary for vision in low-light environments. Generally, flashlights provide a handle for a user to hold when using the light, allowing the user to point the flashlight in any direction to project light to dark, or otherwise unlit areas.

A major problem with standard flashlights is a requirement for a user to hold a handle, thereby limiting the user to having only one free hand, which can be an issue when working in tight spaces or performing actions which require the use of both hands.

While a myriad of flashlights and flashlight holders are widely known, and collectively form a very crowded art, there remains a need for new flashlight holding devices that will provide quick access and use for individual users and professionals alike, such as car mechanics and engineers, among others. Mechanical activities tend to be rigorous, requiring equipment to be readily available and efficiently accessed for use by the user. Thus, there is a need in the art for a flashlight holder with various features to benefit one who works with two hands and in narrow dark spaces. These and other problems will become apparent to one having the ordinary level of skill in the art upon a thorough review of the instant disclosure.

SUMMARY OF THE INVENTION

The disclosure concerns a wristband with integrated rotatable light, including: a band; a base coupled to the band; a light housing rotationally coupled to the base; and a light configured to be removably attached to the light housing.

The wristband with integrated rotatable light is characterized in that when the light is nested inside the light housing with the light housing oriented in a first configuration, the wristband with integrated rotatable light will direct light in a first direction relative to a user's wrist. Upon a user applying a rotational force to the light housing, the light housing is configured to rotate relative to the base and band, placing the light housing in a second configuration, wherein in the second configuration the wristband with integrated rotatable light is configured to direct light in a second direction relative to the base and band, with the second direction being radially distinct from the first direction.

BRIEF DESCRIPTION OF THE DRAWINGS

These and other aspects are described in the appended details and descriptions, particularly when referenced in conjunction with the following drawings, wherein.

DETAILED DESCRIPTION OF THE PREFERRED EMBODIMENTS

For purposes of explanation and not limitation, details and descriptions of certain preferred embodiments are hereinafter provided such that one having ordinary skill in the art may be enabled to make and use the invention. These details and descriptions are representative only of certain preferred embodiments, however, and a myriad of other embodiments which will not be expressly described will be readily understood by one having skill in the art upon a thorough review of the instant disclosure. Accordingly, any reviewer of the instant disclosure should interpret the scope of the invention by the claims, as such scope is not intended to be limited by the embodiments described and illustrated herein.

General Embodiment

In a general embodiment, a wristband with integrated rotatable light includes: a band; a base coupled to the band; a light housing rotationally coupled to the base; and a light configured to be nested within the light housing.

In this regard, the wristband with integrated rotatable light is characterized in that when the light housing is configured in a first configuration relative to the base and band, the wristband with integrated rotatable light will direct the light in a first direction relative to the base and band (i.e. the user's wrist); and wherein upon applying rotational force to the light housing, the light housing is configured to rotate about the base, thereby reconfiguring the light housing in a second configuration, and directing the light in a second direction relative to the base and band, wherein the second direction is radially distinct from the first direction.

The number of incremental positions of the light housing relative to the base can be provided in accordance with the needs of a manufacturer, for example, by providing ratcheting "clicks" such that the desired number of adjustable configurations is implemented about the base. Certain examples are detailed herein, however, one with skill in the art will appreciate various other means by which a light housing may be produced and configured to rotate about a base of a wrist band with rotatable housing.

Illustrated Embodiment

Figure 1:
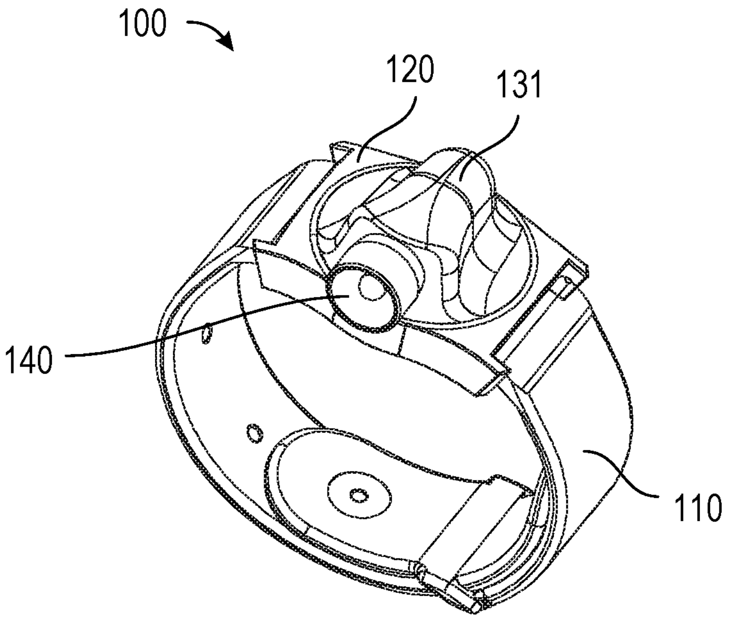
FIG. 1 shows a perspective view of a wristband with integrated rotatable light in accordance with a first embodiment; the wristband with integrated rotatable light is shown with a flashlight housing thereof being configured in a first configuration.

Now, turning to the drawings, FIG. 1 shows a perspective view of a wristband with integrated rotatable light 100 in accordance with a first embodiment; the wristband with integrated rotatable light 100 being configured in a first configuration and shown including: a band 110; a base 120 coupled to the band; a light housing 131 coupled to the base and configured for rotational adjustment thereon; and a light 140 removably nested within the light housing 131.

Figure 2:
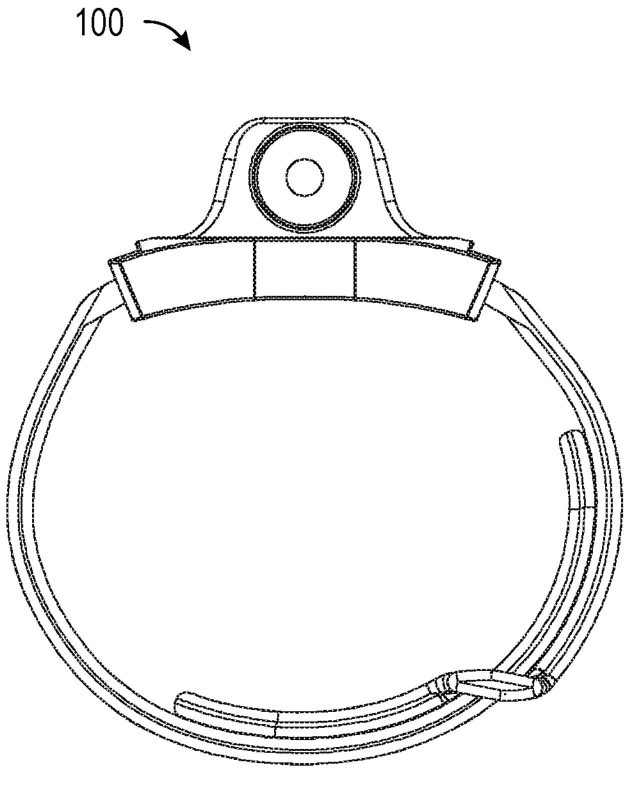
FIG. 2 shows a front view of the wristband with integrated rotatable light in accordance with the first embodiment.

FIG. 2 shows a front view of the wristband with integrated rotatable light 100 in accordance with the first embodiment.

Figure 3:
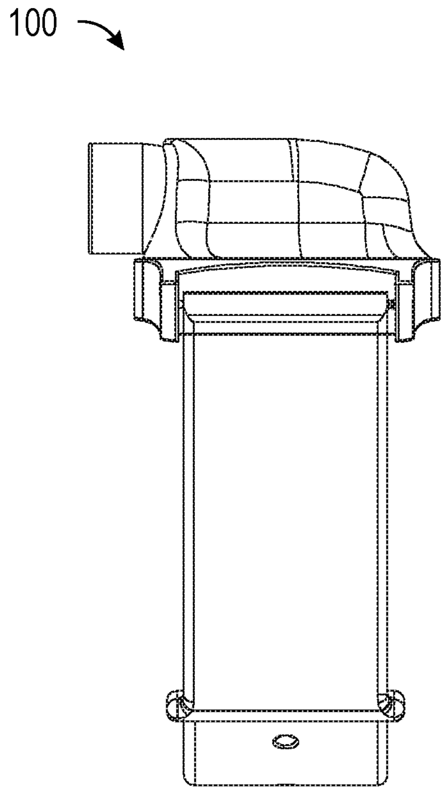
FIG. 3 shows a side view of the wristband with integrated rotatable light in accordance with the first embodiment.

FIG. 3 shows a side view of the wristband with integrated rotatable light 100 in accordance with the first embodiment.

Figure 4:
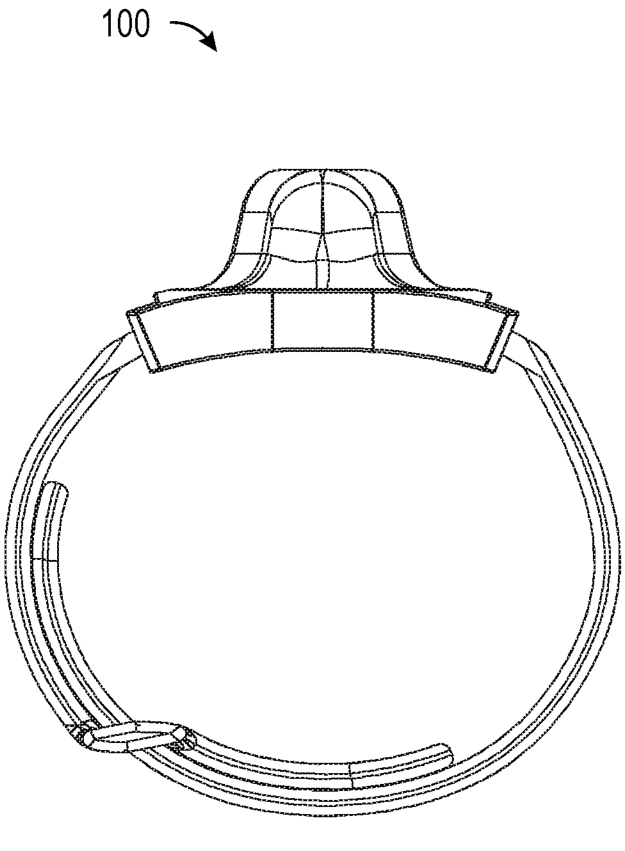
FIG. 4 shows a rear view of the wristband with integrated rotatable light in accordance with the first embodiment.

FIG. 4 shows a rear view of the wristband with integrated rotatable light 100 in accordance with the first embodiment.

FIGS. 5 A-D collectively illustrate a rotational capability of the wristband with integrated rotatable light.

Figure 5A:
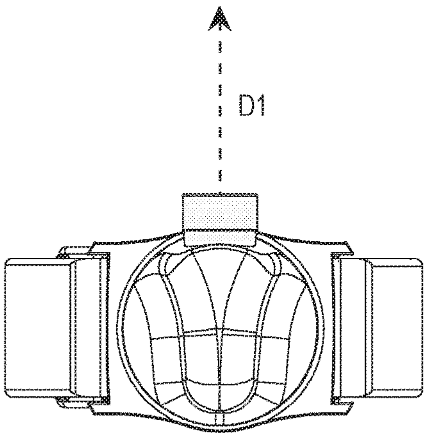
FIG. 5A shows a top view of the wristband with integrated rotatable light in accordance with the first embodiment; the wristband with integrated rotatable light being configured in a first configuration, wherein the flashlight housing is configured to direct light from the flashlight in a first direction relative to the base and band.

FIG. 5A shows a top view of the wristband with integrated rotatable light in accordance with the first embodiment; the wristband with integrated rotatable light being configured in a first configuration, directing light in a first direction D1.

Figure 5B:
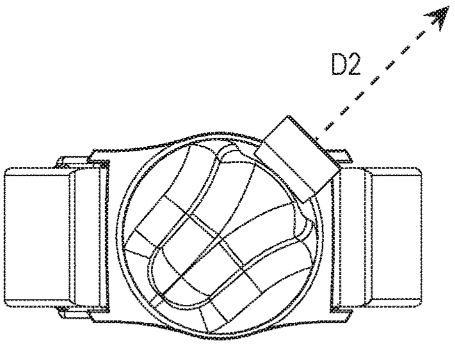
FIG. 5B shows a top view of the wristband with integrated rotatable light in accordance with the first embodiment; the wristband with integrated rotatable light being configured in a second configuration, wherein the flashlight housing is configured to direct light from the flashlight in a second direction relative to the base and band.

FIG. 5B shows a top view of the wristband with integrated rotatable light directing light in a second direction D2 wherein the second direction is distinct from the first direction.

Figure 5C:
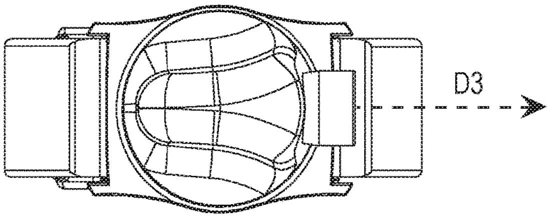
FIG. 5C shows a top view of the wristband with integrated rotatable light in accordance with the first embodiment; the wristband with integrated rotatable light being configured in a third configuration, wherein the flashlight housing is configured to direct light from the flashlight in a third direction relative to the base and band.

FIG. 5C shows a top view of the wristband with integrated rotatable light directing light in a third direction D3 wherein the third direction is distinct from the first and second directions.

Figure 5D:
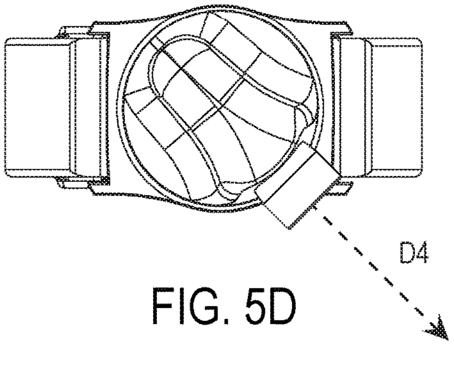
FIG. 5D shows a top view shows a top view of the wristband with integrated rotatable light in accordance with the first embodiment; the wristband with integrated rotatable light being configured in a fourth configuration, wherein the flashlight housing is configured to direct light from the flashlight in a fourth direction relative to the base and band.

FIG. 5D shows a top view of the wristband with integrated rotatable light directing light in a fourth direction D4 wherein the fourth direction is distinct from the first thru third directions.

Now, it should be noted that even though only four rotational positions have been illustrated herein, one with skill in the art may appreciate that the wristband with integrated rotatable light can be cable of rotating among a plurality of positions limited only by the manufacturer, for example, by the number of ratcheting positions created between the base and the housing.

Figure 6A:
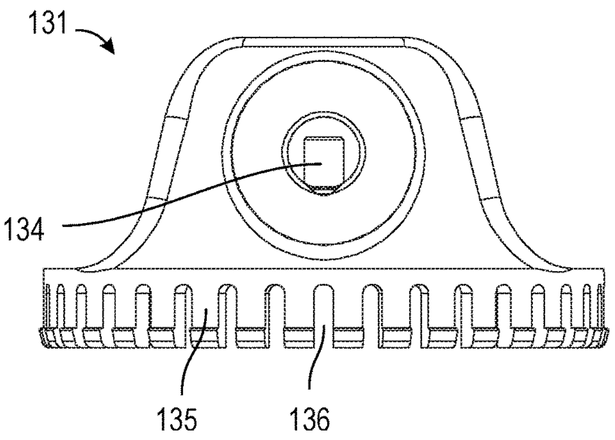
FIG. 6A shows a front view of a light housing in accordance with the first embodiment.

With regard to the light housing 131, FIG. 6A shows a front view of a light housing 131 in accordance with the first embodiment. The light housing 131 includes: a magnetic retaining element 134 disposed within the light housing 131; and a plurality of track engagement elements 135 extending from a bottom surface thereof, with a plurality of spaces 136 formed therebetween.

Figure 6B:
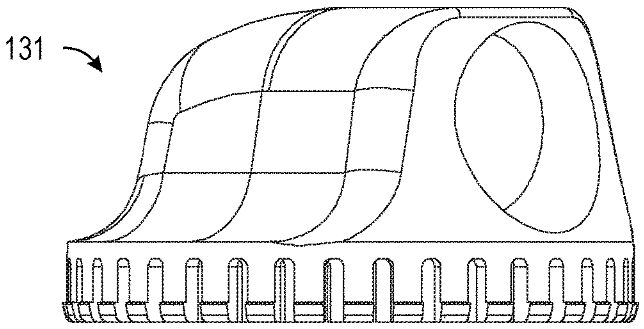
FIG. 6B shows a perspective view of a light housing in accordance with the first embodiment.

FIG. 6B shows a perspective view of the light housing 131 in accordance with the first embodiment.

Figure 6C:
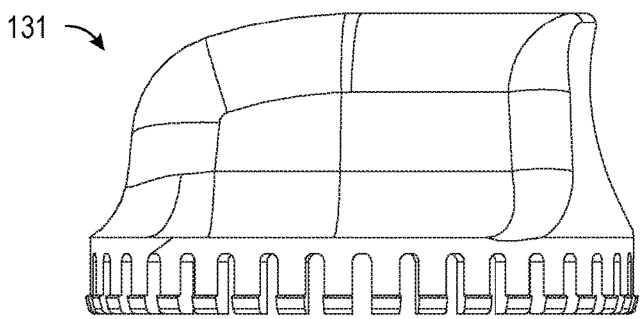
FIG. 6C shows a side view of a light housing in accordance with the first embodiment.

FIG. 6C shows a side view of a light housing 131 in accordance with the first embodiment of a wristband with integrated rotatable light.

Figure 6D:
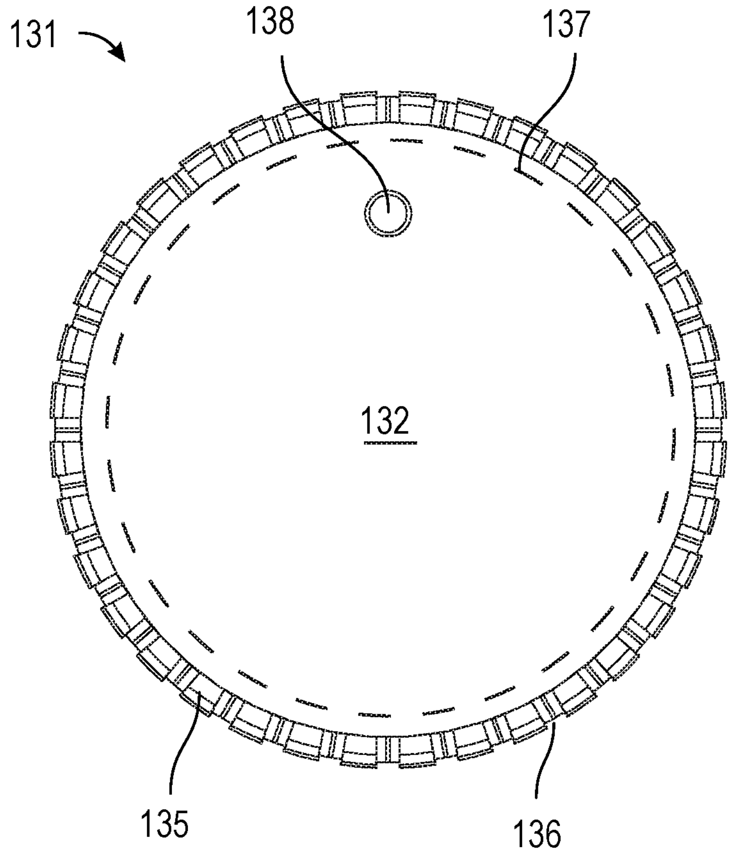
FIG. 6D shows a bottom view of a light housing in accordance with the first embodiment.

Additionally, FIG. 6D shows a bottom view of a light housing 131 in accordance with the first embodiment, wherein the housing includes: a bottom surface 132; a plurality of track engagement elements 135 extending from the bottom surface, with each track engagement element positioned adjacent to an outer periphery 137 of the bottom surface; and a plurality of spaces 136 each formed between the plurality of track engagement elements 135. The light housing 131 includes an optional channel for installing the magnetic retaining element within the light housing. The channel extends from the bottom surface 132 into the volume of the light housing. The light housing 131 also includes an optional Cap 138, to further secure the magnetic retaining element within the light housing. As shown, the flashlight housing comprises a plurality of track engagement elements disposed about a bottom periphery thereof.

The plurality of spaces 136 are sized such that when the light housing 131 is coupled to the base, the plurality of spaces will complementarily receive at least a portion of the detent or the spring end of the retention plate separately, with either isolated in one of a plurality of spaces between the track engagement elements. This helps to secure the light housing 131 in a fixed direction relative to the base, and prevent it from slipping.

Figure 7A:
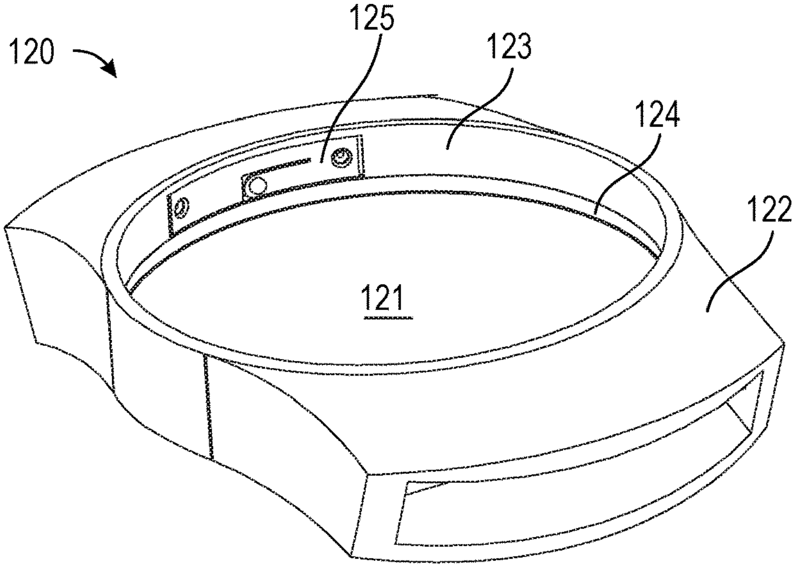
FIG. 7A shows a perspective view of a base forming part of the wristband with integrated rotatable light in accordance with the first embodiment thereof; the base shown including a track and a retention plate each configured to couple with the flashlight housing.

With regard to the base, FIG. 7A shows a perspective view of a first side of a base 120, the base 120 comprises a bottom surface and a wall 123 extending upwardly from the bottom surface, the wall and bottom surface collectively forming a cavity 121 therebetween. The base further including a top surface 122 surrounding the cavity.

The base 120 comprises a track 124 disposed between the wall and the bottom surface of the base. The track can be implemented into the wall 123.

Also shown is a retention plate 125 attached to the wall 123 of the base 120 adjacent to the cavity 121.

Figure 7B:
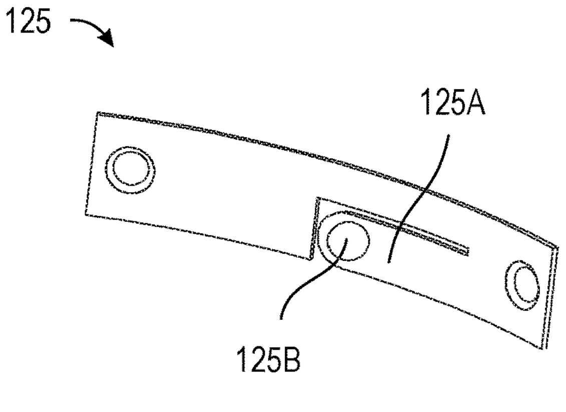
FIG. 7B shows a perspective view of a retention plate, including: a spring element and a rounded portion.

FIG. 7B shows a perspective view of the retention plate 125, the retention plate includes: a spring element 125A and a rounded portion 125B. The spring element 125A, includes a spring force bias which allows the spring end 125B of the retention plate to nest within one of the plurality of spaces formed between the plurality of track engagement elements of the housing. This mechanism helps prevent the light housing from slipping, and fixes the relative direction of emitted light.

Figure 7C:
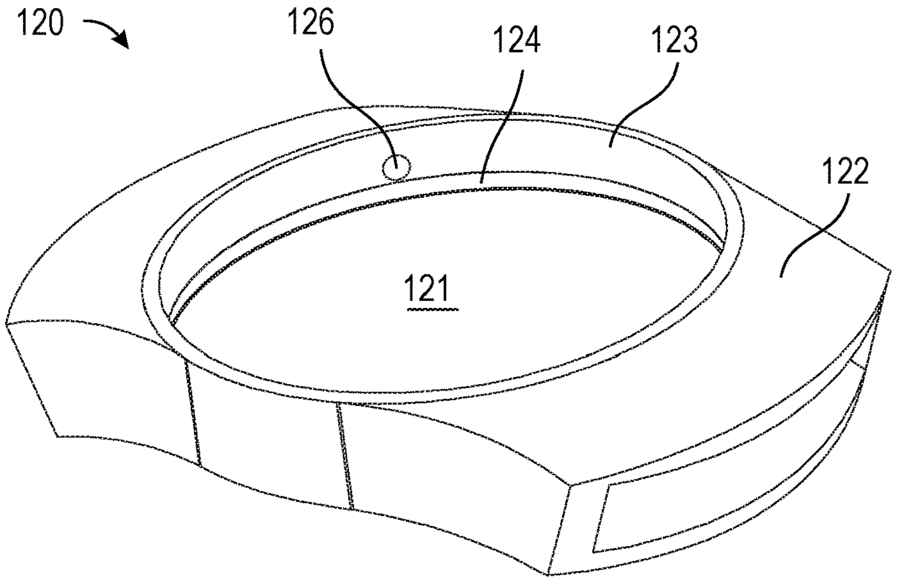
FIG. 7C shows a perspective view of the a base from a second side thereof; the base is shown including a track and a detent disposed within a spring channel on the cavity wall.

FIG. 7C shows a perspective view of a second side of a base 120, the base 120 also including a cavity 121 extending into the top surface 122 of the base forming a cavity wall 123 therein. The base 120 includes a track 124 disposed on the cavity wall 123, and a detent 126 disposed within a spring channel (127, FIG. 8) extending into the cavity wall 123.

Figure 7D:
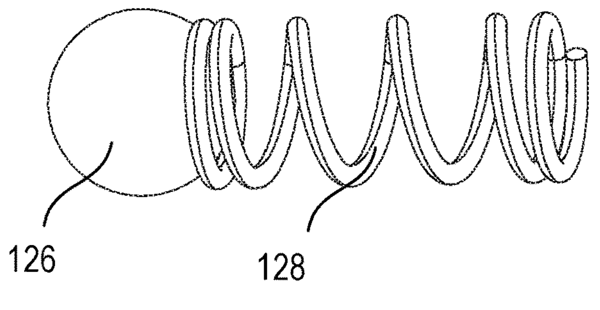
FIG. 7D shows a side view of the detent and a spring.

FIG. 7D shows a side view of a detent 126, the detent configured to engage with a spring 128. Similar to the retention plate, the detent spring assembly is designed to nest at least a portion of the detent within one of the plurality of spaces formed between the plurality of track engagement elements of the light housing.

Figure 8:
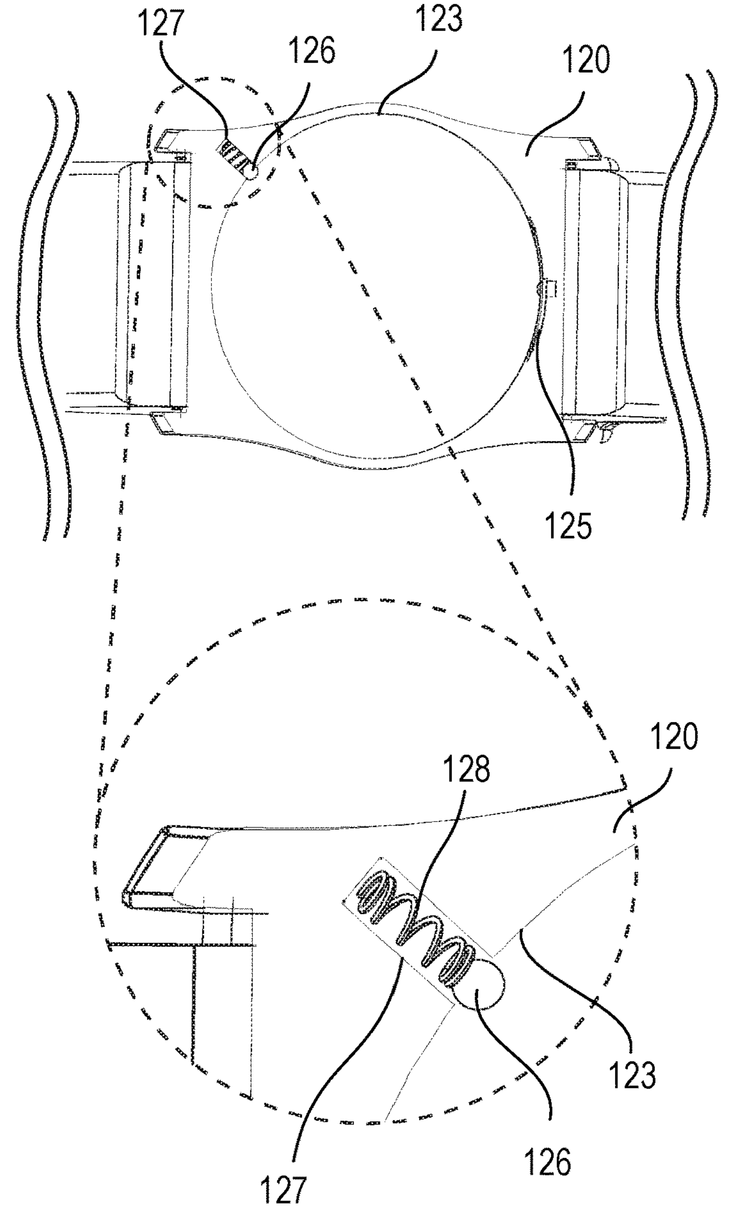
FIG. 8 shows a cross-sectional top view of a base including a retention plate disposed on the cavity wall and a detent disposed within a spring channel extending into a side of the cavity wall.

FIG. 8 shows a cross-sectional top view of a base 120, the base 120 including: a retention plate 125 disposed on the cavity wall 123; and a detent 126 nested within a spring channel 127, the spring channel 127 disposed on the cavity wall 123, at a side of the cavity wall opposing the retention plate 125.

An enhanced view of the portion of the base 120 including the detent 126 is shown wherein at least a portion of the detent 126 and the spring 128, are shown nested within a spring channel 127 disposed on the cavity wall 123.

Figure 9:
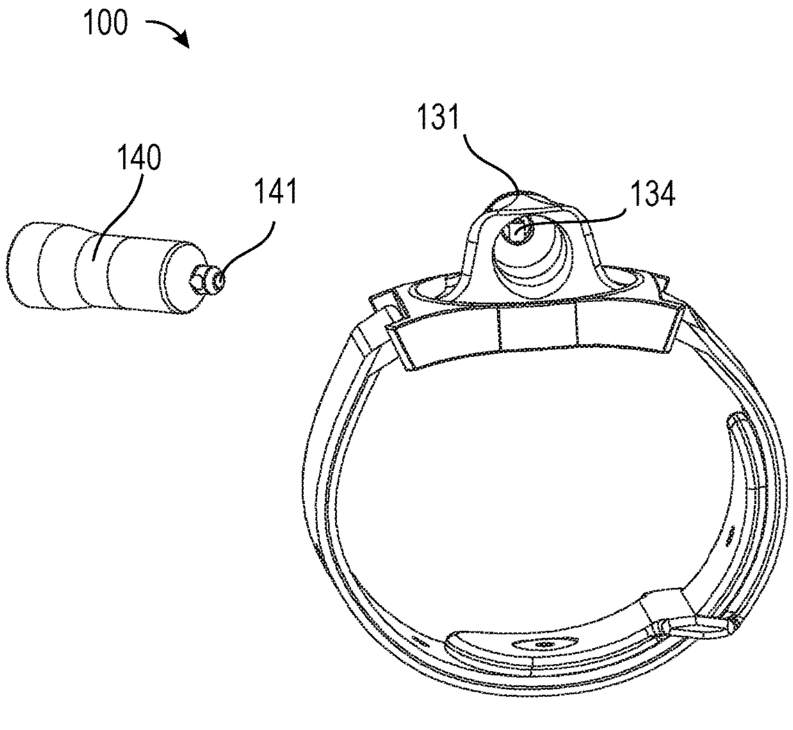
FIG. 9 shows an exploded view of a wristband with integrated rotatable light, with the light removed from the light housing, wherein the light housing has magnetic retaining element disposed therein and the light has a magnetic coupling element disposed at a backside thereof.

Finally, FIG. 9 shows an exploded view of a wristband with integrated rotatable light 100, with the light 140 decoupled from the light housing 131, wherein the light housing 131 includes a magnetic retaining element 134 disposed therein and the light 140 including a magnetic coupling element 141 disposed at a backside thereof.

At each element where magnetism is indicated, for example the magnetic retaining element 134, and magnetic coupling element 141, the respective elements may comprise a magnetized element or a metallic element capable of being energized by a magnetic force.

As would be appreciated by one with skill in the art, the flashlight may be removed for independent use, and re=inserted within the housing for use within the wrist band.

Now, through the disclosure has been described a wristband with integrated rotatable light, comprising: a base configured to receive at least a portion of a rotatable flashlight housing; and a band configured to attach with the base forming an accessory capable of being worn by a user; the flashlight housing being rotatable about the base; wherein the flashlight housing is configured to receive and retain at least a portion of a flashlight therein.

In some embodiments, the flashlight housing is adapted for rotational configuration for directing a beam of the flashlight at any angle relative to the band.

In some embodiments, the base comprises a bottom surface and a wall extending upwardly from the bottom surface, the wall and bottom surface collectively forming a cavity therebetween.

In some embodiments, the wall further comprises a detent configured to extend into a volume of the cavity.

In some embodiments, the detent is combined with a spring configured to bias the detent into the volume of the cavity.

In some embodiments, the wristband with integrated rotatable light further comprises a track disposed between the wall and the bottom surface of the base.

In some embodiments, the flashlight housing comprises a plurality of track engagement elements disposed about a bottom periphery thereof.

In some embodiments, the flashlight housing comprises a plurality of spaces, wherein each space is disposed between two adjacent track engagement elements.

In some embodiments, the flashlight housing is adapted to engage with the base at a mating of track engagement elements and the track, respectively.

In some embodiments, the base further comprises a retention plate disposed flush within the wall.

In some embodiments, the retention plate comprises a spring element and a rounded portion extending from the spring element into the volume of the cavity, wherein the spring element is configured to supply a biased force for engaging the rounded portion with one of the spaces of the flashlight housing.

In some embodiments, a magnetic retaining element is attached to the flashlight housing and configured to magnetically engage and retain a flashlight therewith.

In some embodiments, the flashlight comprises a magnetic coupling element for magnetically engaging the magnetic retaining element fixed within the flashlight housing.

Other Features and Embodiments

The wristband with integrated rotatable light is designed to be worn on the body, e.g. on or under the wrist to provide light therefrom. In the illustrated embodiment, the band includes a set of watch straps. As one with skill in the art may appreciate, the bands may be made of: fiber, plastic, silicon, leather, metal links, or any other material commonly used in the art. The band may include a two portion watch style band, a monolithic single piece band configured to attach to the base at either end, a snap wristband, or any other type of instrument used to mount devices to a one's person.

The illustrated embodiment is a watch style product that is designed to receive a NANO LIGHT® flashlight or any other small light source. In one embodiment, the light and light housing are designed to be rotationally adjusted about the base such that they can rotate in excess of 360 degrees. In another embodiment, a wristband with integrated rotatable light may be scaled up or down, in order to receive any size or shape flashlight or light source commonly used in the art. Similarly, rather than providing a removable engagement, a wristband with integrated rotatable light may incorporate an integrated light source which is not removable from the light housing.

In the illustrated embodiment, the light source might have a disposable battery contained within the light source, possibly requiring a user to change the battery as required. In another embodiment the light source may have an integrated rechargeable battery. In such an embodiment the light, base, or light housing may be integrated with a port to receive a plug for recharging the rechargeable battery. Additionally, inductive charging techniques may be integrated into the light source, to provide wireless charging capabilities.

In another embodiment, the base, light housing, and light might be configured to also be mounted on a bike, on a helmet, or on a standalone adapter.

Methods of Manufacture

The base and light housing, may be fabricated from plastic either together or individually by: injection molding, blow molding, 3D printing, or any other known method of manufacturing in the art.

In addition to plastic, the base, and light housing may be made of wood, bamboo, metal, or any composite material. If another material is chosen, they might be fabricated using any known method of manufacturing techniques for the chosen material.

While certain details and descriptions have been provided herein for the purpose of illustrating to one having skill in the art how to make and use the invention, it should be understood that other features, embodiments and arrangements of the elements herein can be appreciated without departing from the spirit and scope of the invention as-claimed.

FEATURE LIST (100) Band Having Rotationally Adjustable Light
(110) Band
(120) Base
(121) Cavity
(122) Top Surface
(123) Cavity Wall
(124) Track
(125) Retention Plate
(125A) Spring Element
(125B) Rounded Portion
(126) Detent
(127) Spring Channel
(128) Spring
(131) Light Housing
(132) Bottom Surface
(134) Magnetic retaining element
(135) Track engagement element
(136) Plurality of Spaces Between Track engagement elements
(137) Bottom Surface Outer Periphery
(138) Cap
(140) Light
(141) Magnetic coupling element
(201) First Direction
(202) Second Direction

What is claimed is:

1. A wristband with integrated rotatable light, comprising:
a base configured to receive at least a portion of a rotatable flashlight housing; and
a band configured to attach with the base forming an accessory capable of being worn by a user;
the flashlight housing being rotatable about the base;
characterized in that the base comprises:
a bottom surface,
a wall extending upwardly from the bottom surface, and
a track disposed on one of: the bottom surface and the wall;
the wall and bottom surface collectively forming a cavity therebetween;
wherein the flashlight housing is configured to receive and retain at least a portion of a flashlight therein.

2. The wristband with integrated rotatable light of claim 1, wherein the flashlight housing is adapted for rotational configuration for directing a beam of the flashlight at any angle relative to the band.

3. The wristband with integrated rotatable light of claim 1, the wall further comprising a detent configured to extend into a volume of the cavity.

4. The wristband with integrated rotatable light of claim 3, said detent comprising a spring configured to bias the detent into the volume of the cavity.

5. The wristband with integrated rotatable light of claim 1, wherein the flashlight housing comprises a plurality of track engagement elements disposed about a bottom periphery thereof.

6. The wristband with integrated rotatable light of claim 5, wherein the flashlight housing comprises a plurality of spaces, wherein each space is disposed between two adjacent track engagement elements.

7. The wristband with integrated rotatable light of claim 5, wherein the flashlight housing is adapted to engage with the base at a mating of track engagement elements and the track, respectively.

8. The wristband with integrated rotatable light of claim 7, the base further comprising a retention plate disposed flush within the wall.

9. The wristband with integrated rotatable light of claim 8, wherein the retention plate comprises a spring element and a rounded potion extending from the spring element into the volume of the cavity, wherein the spring element is configured to supply a biased force for engaging the rounded portion with one of the spaces of the flashlight housing.

10. The wristband with integrated rotatable light of claim 1, wherein a magnetic retaining element is attached to the flashlight housing and configured to magnetically engage and retain a flashlight therewith.

11. The wristband with integrated rotatable light of claim 10, wherein the flashlight comprises a magnetic coupling element for magnetically engaging the magnetic retaining element fixed within the flashlight housing.

* * * * *